United States Patent
Ahn et al.

(10) Patent No.: US 7,944,835 B2
(45) Date of Patent: May 17, 2011

(54) DATA TRANSMISSION METHOD USING THE NUMBER OF STATIONS JOINED MULTICAST SERVICE, BASE STATION AND TERMINAL DEVICE THEREFOR, AND WIRELESS COMMUNICATION SYSTEM HAVING THE SAME

(75) Inventors: Tae Hee Ahn, Osan (KR); Yang gi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 959 days.

(21) Appl. No.: 11/830,371

(22) Filed: Jul. 30, 2007

(65) Prior Publication Data

US 2008/0186913 A1    Aug. 7, 2008

(30) Foreign Application Priority Data

Feb. 6, 2007    (KR) .................. 10-2007-0012278

(51) Int. Cl.
   *G06F 11/00*    (2006.01)
(52) U.S. Cl. .............. 370/235; 370/229; 370/230.1; 370/312; 370/328; 370/329; 370/338; 370/349; 370/395.4; 370/431; 370/432; 370/395.42; 370/395.43; 455/518; 455/519; 455/450; 455/452.1; 455/452.2; 455/453
(58) Field of Classification Search .......... 370/235, 370/235.1, 328, 329, 330, 336, 337, 338, 370/341, 345, 346, 347, 349, 395.2, 395.21, 370/312, 395.4, 395.41, 395.42, 395.43, 370/412, 431, 432, 436, 442, 443, 444, 445, 370/230.1, 229, 348; 455/518, 519, 450, 455/453, 41.2, 451, 452.1, 452.2
See application file for complete search history.

(56) References Cited

U.S. PATENT DOCUMENTS 7,251,232 B1 *   7/2007   Meier ..................... 370/338
7,315,528 B2 *   1/2008   Leeuwen .................. 370/329
(Continued)

FOREIGN PATENT DOCUMENTS

KR    10-0694215 B1    3/2007

OTHER PUBLICATIONS

Qiang Ni, Lamia Romdhani, Thierry Turletti, A Survey of QoS Enhancements for IEEE 802.11 Wireless LAN, 2004, Journal of Wireless Communications and Mobile Computing, Wiley, vol. 4, Issue 5, pp. 547-566.*

*Primary Examiner* — Olumide T Ajibade Akonai
(74) *Attorney, Agent, or Firm* — Birch, Stewart, Kolasch & Birch, LLP

(57) ABSTRACT

The present invention relates to a wireless communication data transmission method considering the number of terminals requesting services. The present invention provides a wireless communication base station for use in a network where a multicast service is received from a network entity and is provided to at least one or more terminals in contention-based channel access mode of a wireless communication. The base station comprises a storage unit for storing terminal information including the number of terminals which have joined the multicast service, and a priority determining unit for setting a user priority of a data frame to be transmitted using the terminal information. According to the present invention, a priority of data to be transmitted is determined in consideration of the number of serviced terminals, and thus, the data can be reasonably transmitted.

23 Claims, 10 Drawing Sheets

U.S. PATENT DOCUMENTS

| | | | |
|---|---|---|---|
| 7,388,833 B2 * | 6/2008 | Yuan et al. | 370/230.1 |
| 7,616,616 B2 * | 11/2009 | Amann et al. | 370/338 |
| 7,684,333 B1 * | 3/2010 | Dasylva et al. | 370/235.1 |
| 7,826,438 B1 * | 11/2010 | Salhotra et al. | 370/345 |
| 7,826,472 B2 * | 11/2010 | Kappes et al. | 370/445 |
| 2004/0213191 A1 * | 10/2004 | Lee | 370/338 |
| 2005/0100022 A1 * | 5/2005 | Ramprashad | 370/395.42 |
| 2005/0152373 A1 * | 7/2005 | Ali | 370/395.4 |
| 2005/0270977 A1 * | 12/2005 | King et al. | 370/235 |
| 2007/0025304 A1 * | 2/2007 | Leelahakriengkrai et al. | 370/338 |

* cited by examiner

– Contention between ACs in station –

– EDCA channel access method –

- EDCA TXOP bursting -

Fig. 11
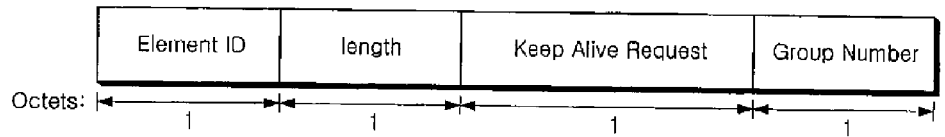
Fig. 12
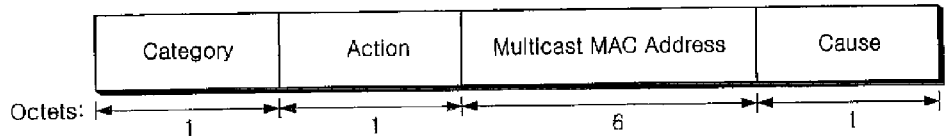
Fig. 13
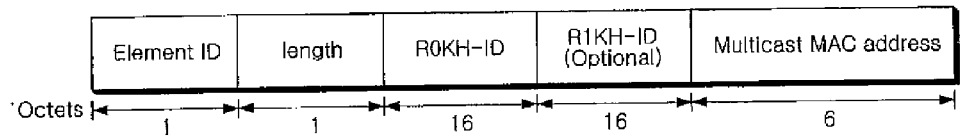
Fig. 14
| Order | Information |
|---|---|
| X | Multicast MAC address(Include service information of STA) |
– association request frame body –
Fig. 15a
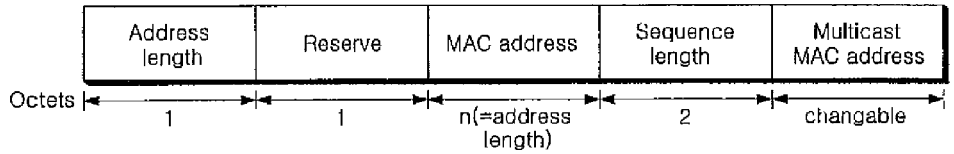
– ADD-notify data field format –

— MOVE-notify data field format —

DATA TRANSMISSION METHOD USING THE NUMBER OF STATIONS JOINED MULTICAST SERVICE, BASE STATION AND TERMINAL DEVICE THEREFOR, AND WIRELESS COMMUNICATION SYSTEM HAVING THE SAME

BACKGROUND OF THE INVENTION

1. Field of the Invention

The present invention relates to a wireless communication data transmission method considering the number of terminals requesting services.

2. Description of the Related Art

Wireless local area networks (LAN) are widely used in a variety of wireless user environments such as home networks, enterprise wireless networks and hot spots. A legacy commercial wireless LAN is an extension of the Ethernet, which provides only best effort services based on IEEE 802.11b standardized in 1999. However, wireless LAN users desire faultless transfer of multimedia streams without losing transmission data. Particularly, even in a wireless LAN environment, superior quality of service (QoS) is indispensable to new applications such as video or multimedia streaming.

Continuous desires of users for bandwidth expansion cause increased congestion and decreased relative transmission speed of the entire wireless network. Accordingly, a network manager comes to need a new mechanism to guarantee services of applications that require strict QoS even in a network with high congestion. Such requirements result in the development of a further enhanced media access control (MAC) protocol than in the conventional LAN.

802.11 MAC defines a mandatory function of distributed coordination function (DCF) and an optional function of point coordination function (PCF). That is, a transmission medium can operate both in contention mode of DCF and in contention free mode of PCF. DCF is an asynchronous transmission method, which provides a basic medium access method of 802.11 MAC and has been implemented in all kinds of commercial wireless LAN products. In terms of wireless medium access, DCF does not consider priorities between stations (terminals, hereinafter referred to as 'STA') at all. Such a characteristic of DCF does not reflect transmission of various types of data traffic, and thus cannot support QoS requested by users in the end.

A synchronous transmission method is a medium access method based on a polling mechanism, which is implemented through PCF. In PCF, a function of a point coordinator (PC) is placed at a central base station, and the base station directly controls all services provided to STAs in a centralized polling scheme. That is, the base station periodically polls connected STAs to give an opportunity to transmit frames to the STAs.

Legacy 802.11 MAC has many problems in supporting wireless LAN QoS. The DCF, i.e. a mandatory function of 802.11 MAC, does not provide any function of supporting QoS. Accordingly, when a DCF method is used, all data traffics are serviced in order of arriving at a transmission queue and processed in best effort mode.

Contrary to the DCF, PCF of 802.11 MAC has been developed to support real-time traffic services but currently supports QoS. However, the PCF has the following problems.

That is, in PCF, the PC placed at the base station defines a scheduling algorithm for the purpose of polling simply based on a round-robin method. However, there are practically various types of traffics that require differentiated QoS, and thus, the round-robin algorithm that cannot assign a priority to traffic is insufficient for supporting QoS.

Further, there is a problem in that if the size of a super frame is small, alternations between a contention period and a contention free period can lead to a considerable overhead.

Further, in legacy MAC, transmission of beacon frames or a starting point of a super frame can be changed. The PC prepares a beacon frame that should be transmitted after a target beacon transmission time (TBTT), and then transmits the beacon frame if the medium is idle as long as a point inter-frame space (PIFS). However, even though STAs cannot complete transmission of frames before a subsequent TBTT, they even can start to transmit frames. Therefore, there is another problem in that the transmission of beacon frame can be delayed.

The delay of beacon frame which should be transmitted immediately after the TBTT delays the transmission of time-constraint frames which should be transmitted within the contention free period. Such a problem causes time delay that is difficult to estimate in a contention free period and thus has a serious influence on QoS.

SUMMARY OF THE INVENTION

The present invention is conceived to solve the aforementioned problems in the prior art. Accordingly, an object of the present invention is to provide a data transmission method and a base station therefor, wherein the number of terminals receiving a multicast service is considered in determining a priority for channel access to thereby determine a priority of a data frame to be transmitted when using a contention-based channel access method of enhancing quality of service of a multicast wireless communication.

Another object of the present invention is to provide a data transmission method and a base station therefor, wherein varying terminal state information is continuously provided to the base station to allow an optimal priority to be granted to a data frame.

According to an aspect of the present invention for achieving the objects, there is provided a wireless communication base station for use in a network where a multicast service is received from a network entity and is provided to at least one or more terminals in contention-based channel access mode of a wireless communication. The base station of the present invention comprises a storage unit for storing terminal information including the number of terminals which have joined the multicast service; and a priority determining unit for setting a user priority of a data frame to be transmitted using the terminal information.

At this time, the priority determining unit may determine the user priority of the frame according to a priority table and adjust the user priority using the terminal information stored in the storage unit.

Here, the user priority may be adjusted by classifying the number of terminals, which have joined the multicast service, into a plurality of groups, putting an adjustment value to each group, and adjusting the user priority according to the adjustment value of a group corresponding to the number of terminal that desire to receive the data frame.

The priority determining unit may set the user priority to zero if the adjusted user priority is smaller than zero, and set the user priority to seven if the adjusted user priority is greater than seven.

Alternatively, the priority determining unit may determine a first user priority of the frame according to the priority table, and create a second user priority by adjusting the first user priority using the terminal information stored in the storage unit.

At this time, the user priority may be adjusted by classifying the number of terminals, which have joined the multicast service, into a plurality of groups, putting an adjustment value to each group, and adjusting the first user priority according to the adjustment value of a group corresponding to the number of terminal that desire to receive the data frame.

Further, the priority determining unit may set the second user priority to zero if the second user priority is smaller than zero, and set the second user priority to seven if the second user priority is greater than seven.

In the meantime, the user priority may be adjusted either by incrementing the user priority by a predetermined value if the number of terminals that desire to receive the data frame is greater than a reference value or by decrementing the user priority by a predetermined value if the number of terminals that desire to receive the data frame is smaller than a reference value.

According to another aspect of the present invention, there is provided a wireless communication base station for use in a network where a multicast service is received from a network entity and is provided to at least one or more terminals in contention-based channel access mode of a wireless communication. The base station of the present invention comprises a storage unit for storing terminal information including the number of terminals which have joined the multicast service; a priority determining unit for setting a user priority of a data frame to be transmitted; and a virtual collision handler for selecting a data frame to be transmitted from a queue, in which the data frame is stored, using the terminal information if a collision occurs between access categories (ACs).

At this time, the virtual collision handler may select a data frame by adjusting the user priority using the terminal information, comparing the adjusted user priority with other user priorities and selecting a data frame with a highest adjusted user priority.

Alternatively, the virtual collision handler may select a data frame by adjusting the user priority according to the terminal information to create a second user priority, and selecting a data frame with a highest second user priority.

Furthermore, the adjustment may be performed in the same as described above.

In addition, the terminal information of mobile terminals that have joined the multicast service may be updated at predetermined time intervals.

According to a further aspect of the present invention, there is provided a wireless communication terminal included in a network where a multicast service is provided to at least one or more terminals in contention-based channel access mode. The terminal of the present invention is configured to transmit a request message for joining the multicast service, transmit a response message in response to a confirm request message received from the network and receive a multicast service data whose user priority has been changed on the basis of the response message.

According to a still further aspect of the present invention, there is provided a wireless communication system for use in a network where a multicast service is provided to at least one or more terminals in contention-based channel access mode. The system of the present invention comprises a terminal for transmitting a request message for joining the multicast service, transmitting a response message in response to a terminal state confirm request message received from the network and receiving a multicast service data whose user priority has been changed on the basis of the response message; and a base station for transmitting the terminal state confirm request message to confirm whether the terminal has joined the multicast service, receiving a response message from the terminal to change a user priority of multicast service data for the terminal which has joined the multicast service, and providing the multicast service data to the terminal.

According to a still further aspect of the present invention, there is provided a data transmission method for use in a network where a multicast service is received from a network entity and is provided to at least one or more terminals in contention-based channel access mode of a wireless communication, which comprises the steps of determining, by a priority determining unit provided to a base station, a user priority of a data frame to be transmitted; examining terminal information of a terminal, which desires to receive the data frame, from a storage unit for storing terminal information of terminals which have joined the multicast service; adjusting the user priority using the terminal information; and determining an AC of the data frame based on the adjusted user priority.

At this time, the user priority may be determined according to a priority table.

Further, the data frame may be stored in a transmission queue corresponding to the determined AC.

In addition, a virtual collision handler may select and transmit a data frame with a highest adjusted user priority if a collision occurs between ACs when the data frame is transmitted.

According to a still further aspect of the present invention, there is provided a data transmission method for use in a network where a multicast service is received from a network entity and is provided to at least one or more terminals in contention-based channel access mode of a wireless communication, which comprises the steps of (a) determining, by a priority determining unit provided to a base station, a first user priority of a data frame to be transmitted according to a priority table; (b) examining terminal information of a terminal, which desires to receive the data frame, from a storage unit for storing terminal information of terminals which have joined the multicast service; (c) creating a second user priority by adjusting the first user priority using the terminal information; and (d) determining an AC of the data frame based on the second user priority.

At this time, the method of the present invention may further comprises after step (c), the steps of setting the second user priority to zero if the second user priority is smaller than zero and setting the second user priority to seven if the second user priority is greater than seven.

According to a still further aspect of the present invention, there is provided a data transmission method for use in a network where a multicast service is received from a network entity and is provided to at least one or more terminals in contention-based channel access mode of a wireless communication, which comprises the steps of examining terminal information of a terminal, which desires to receive a data frame to be transmitted, from a storage unit for storing terminal information of terminals which have joined the multicast service; determining, by a priority determining unit provided to a base station, a user priority of the data frame to be transmitted using the terminal information; and determining an AC of the data frame based on the user priority.

According to a still further aspect of the present invention, there is provided a data transmission method for use in a network where a multicast service is received from a network entity and is provided to at least one or more terminals in contention-based channel access mode of a wireless communication, which comprises the steps of determining, by a priority determining unit provided to a base station, a user priority of a data frame to be transmitted; determining an AC of the data frame based on the user priority; examining terminal information of a terminal, which desires to receive the data frame, from a storage unit for storing terminal information of terminals that have joined the multicast service, if a collision occurs between ACs when the data frame is transmitted; adjusting the user priority using the terminal information; and selecting and transmitting, by a virtual collision handler, a data frame with a highest adjusted user priority.

At this time, the user priority may be adjusted either by incrementing the user priority by a predetermined value if the number of terminals that desire to receive the data frame is greater than a reference value, or by decrementing the user priority by a predetermined value if the number of terminals that desire to receive the data frame is smaller than a reference value.

According to a still further aspect of the present invention, there is provided a data transmission method for a wireless communication terminal included in a network where a multicast service is provided to at least one or more terminals in contention-based channel access mode, which comprises the steps of transmitting a request message for joining the multicast service; transmitting a response message in response to a terminal state confirm request message received from the network; and receiving multicast service data transmitted from the network after the network has changed a user priority of the multicast service data for the terminal that has joined the multicast service on the basis of the terminal state confirm request message.

According to a still further aspect of the present invention, there is provided a data transmission method for use in a wireless communication network including a base station for providing a multicast service to at least one or more terminals in contention-based channel access mode and a terminal for receiving the multicast service from the base station, which comprises the steps of transmitting, by the terminal, a request message for joining the multicast service to the base station; transmitting, by the base station, a terminal state confirm request message for confirming a state of the terminal to the terminal; transmitting, by the terminal, a response message to the base station in response to the terminal state confirm request message; and changing, by the base station, a user priority of multicast service data for the terminal that has joined the multicast service on the basis of the response message and then transmitting the multicast service data to the terminal.

According to the present invention so configured, since a data frame frequently requested by terminals can be preferentially transmitted, there is an advantage in that data can be transmitted in consideration of the number of users (terminals).

BRIEF DESCRIPTION OF THE DRAWINGS

FIG. 11 is a view showing an example of a keep-alive request capability information element (IE).

FIG. 12 is a view showing an example of a keep-alive response message according to an embodiment of the present invention.

FIG. 13 is a view showing a fast BSS transition information element additionally including an information element according to an embodiment of the present invention.

FIG. 14 is a view showing an example of an association request frame body according to an embodiment of the present invention.

FIG. 15a is a view showing an example of an ADD-notify packet according to an embodiment of the present invention.

DETAILED DESCRIPTION OF THE INVENTION

In the present invention, information on the number of terminal devices receiving data is considered when determining a contention-based channel access priority to guarantee quality of service (QoS) of a wireless communication. The present invention is not limited to the contents of the IEEE 802.11e standard. However, as a preferred embodiment of the present invention, an example that is applied in a wireless communication conforming to the IEEE 802.11e standard will be described for convenience of explanation.

Hereinafter, a preferred embodiment of a wireless communication system, a terminal device and a base station for the system, and a method of determining a channel access priority according to the present invention will be described in detail with reference to the accompanying drawings.

Figure 1:
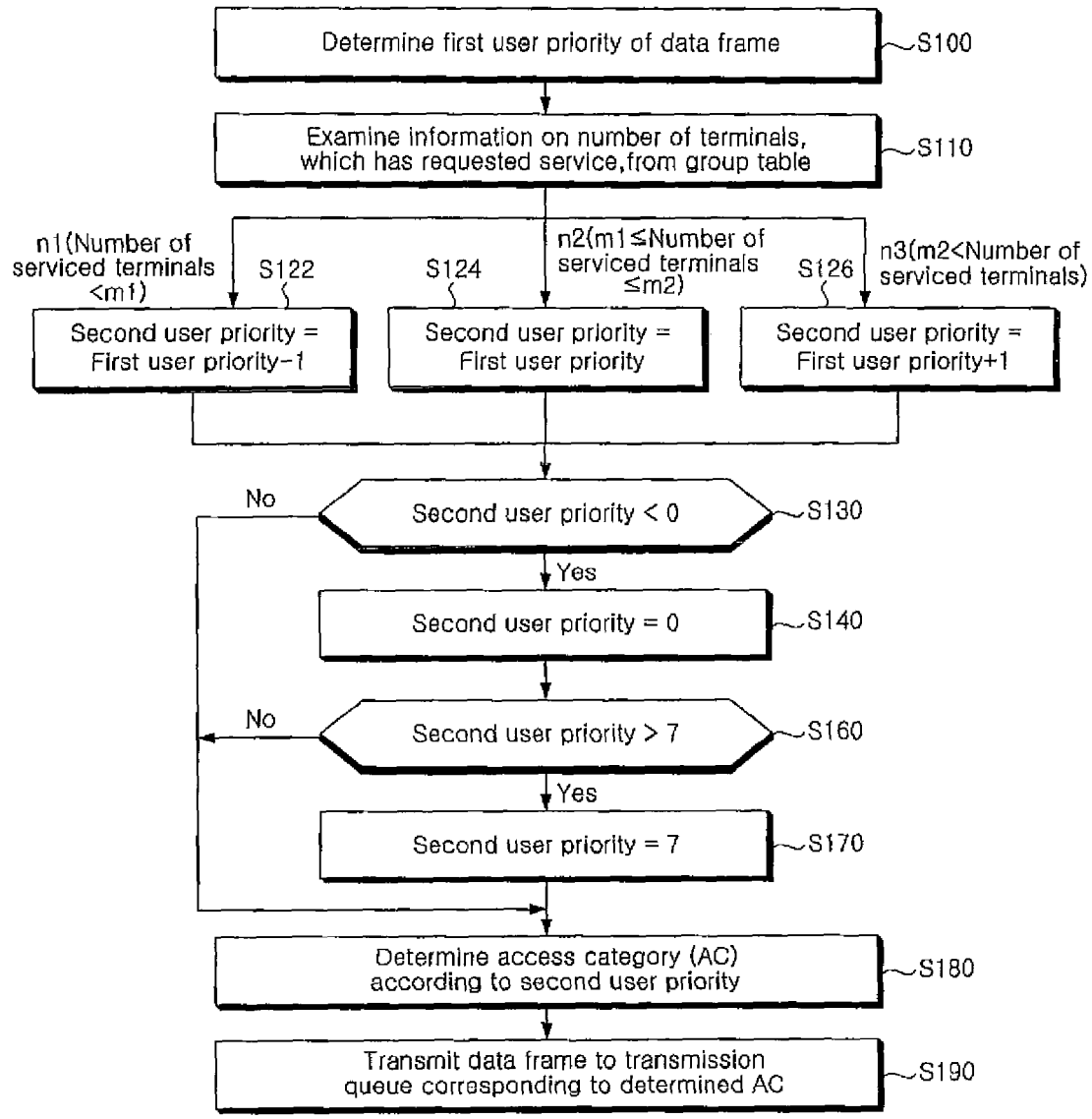
FIG. 1 is a flowchart illustrating a process of determining an AC of a data frame according to a first embodiment of the present invention.
Figure 2:
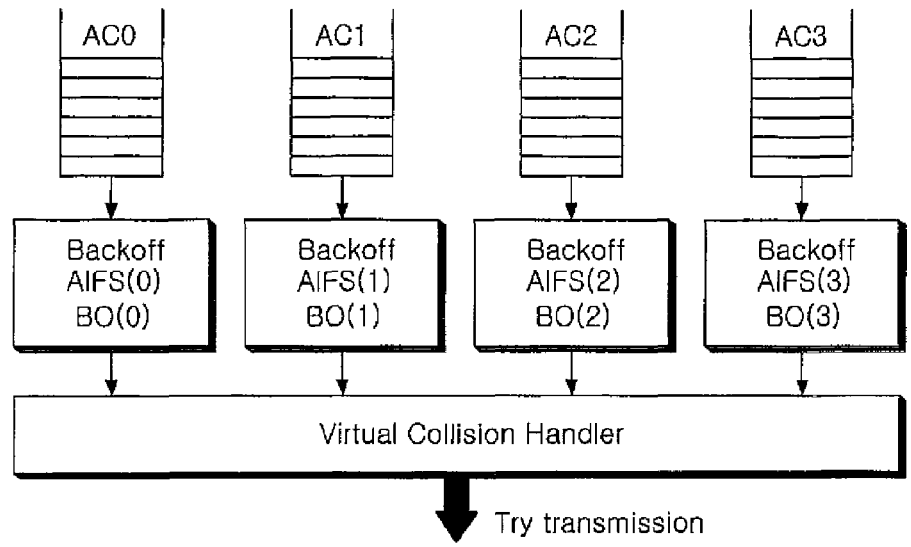
FIG. 2 is a schematic view illustrating a contention state between access categories (AC) within a station in the EDCA method.
Figure 3:
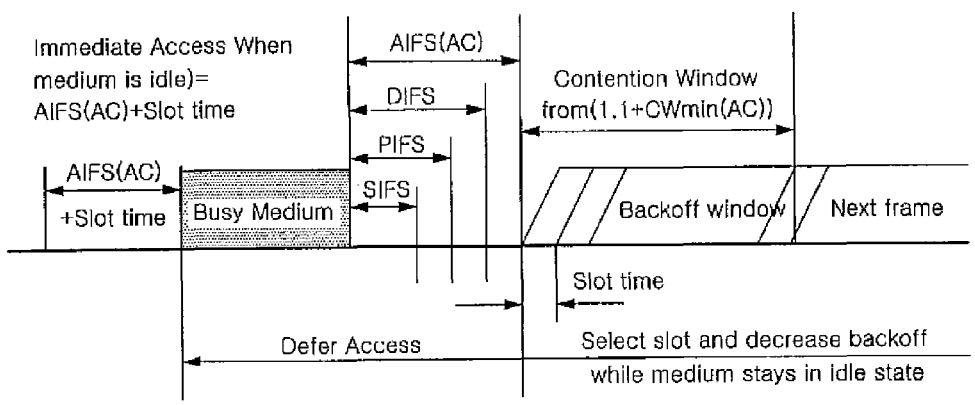
FIG. 3 is a schematic view illustrating an EDCA channel access method.
Figure 4:
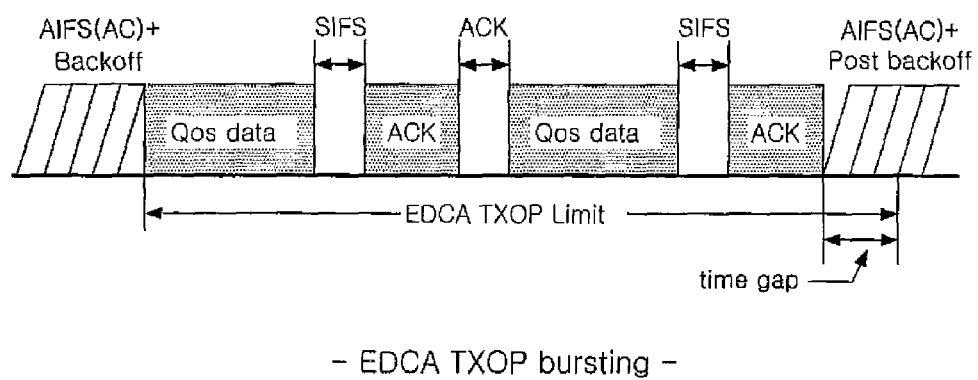
FIG. 4 is a schematic view illustrating EDCA TXOP bursting.
Figure 5:
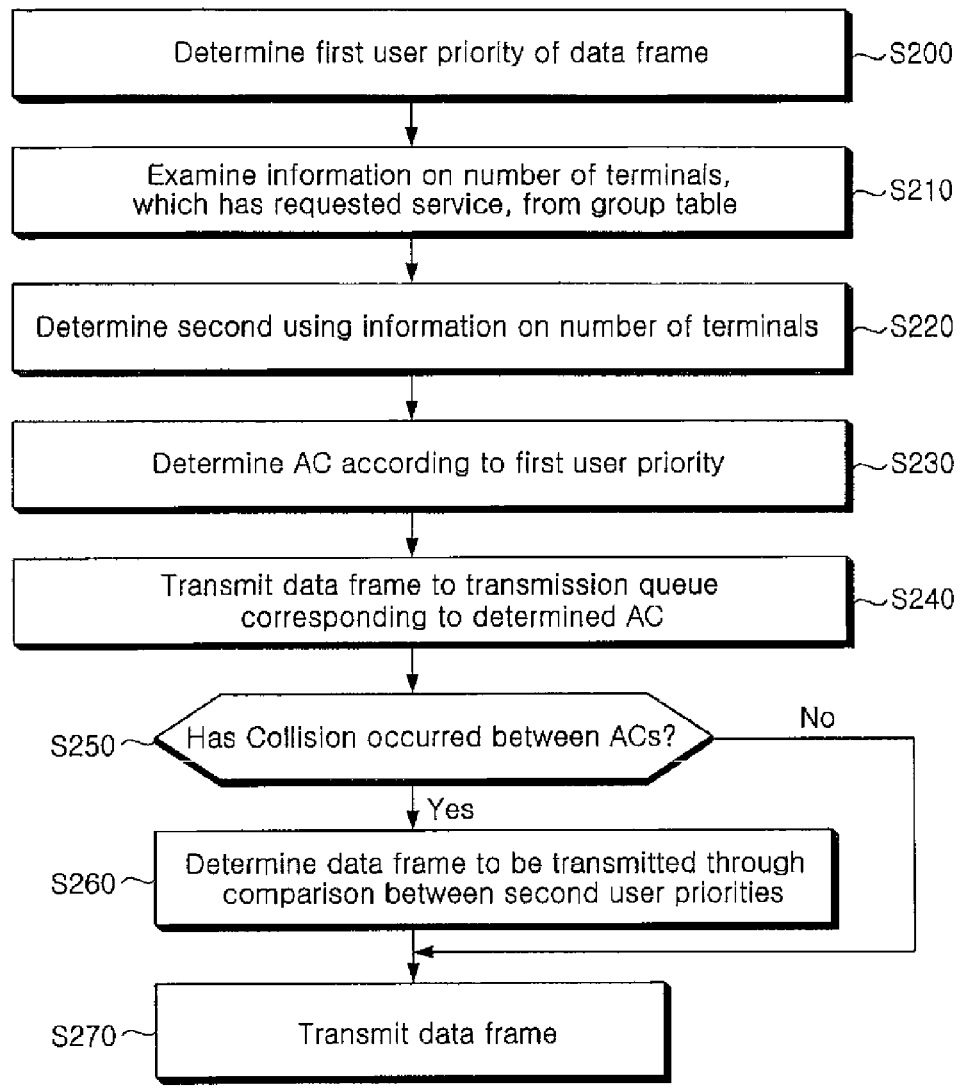
FIG. 5 is flowchart illustrating a process of transmitting a data frame according to a second embodiment of the present invention.
Figure 6:
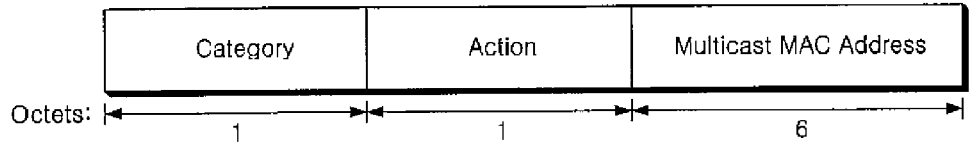
FIG. 6 is a view showing an example of a service activation request action frame according to an embodiment of the present invention.
Figure 7:
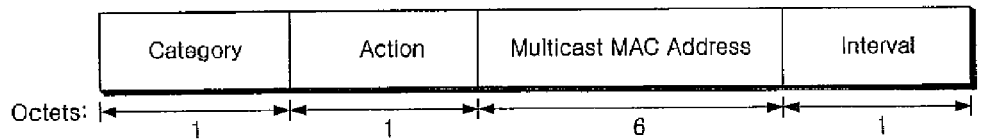
FIG. 7 is a view showing another example of a service activation request action frame according to an embodiment of the present invention.
Figure 8:
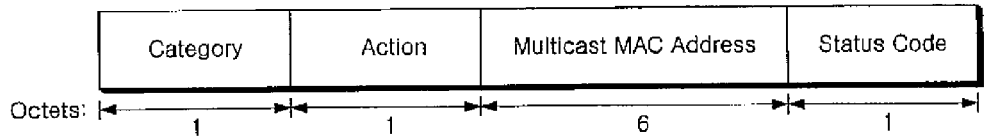
FIG. 8 is a view showing an example of a service activation response action frame proposed in an embodiment of the present invention.
Figure 9:
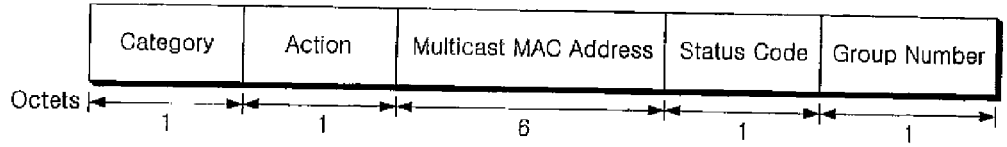
FIG. 9 is a view showing another example of a service activation response action frame proposed in an embodiment of the present invention.
Figure 10:
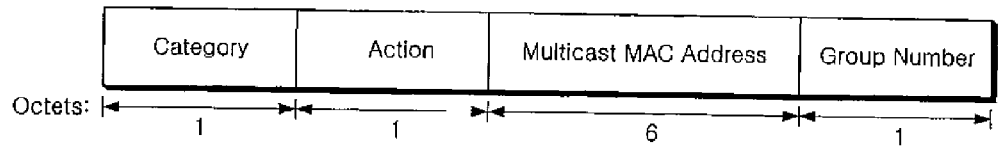
FIG. 10 is a view showing an example of a keep-alive request action frame for inquiring, by a base station, whether a mobile terminal exists in a network.
Figure 15B:
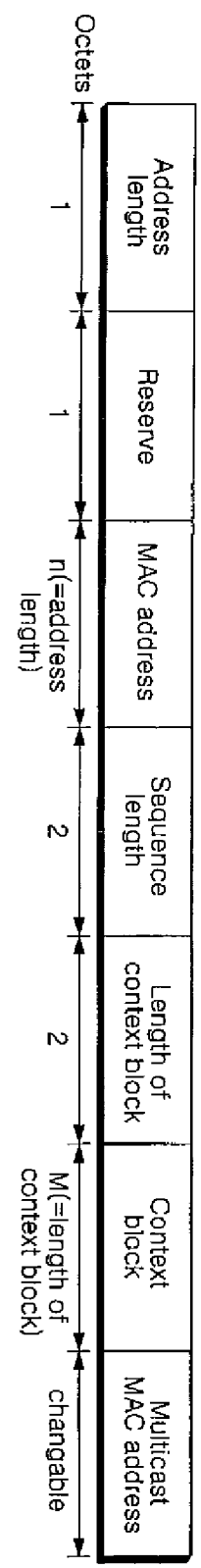
FIG. 15b is a view showing an example of an MOVE-notify packet according to an embodiment of the present invention.
Figure 16:
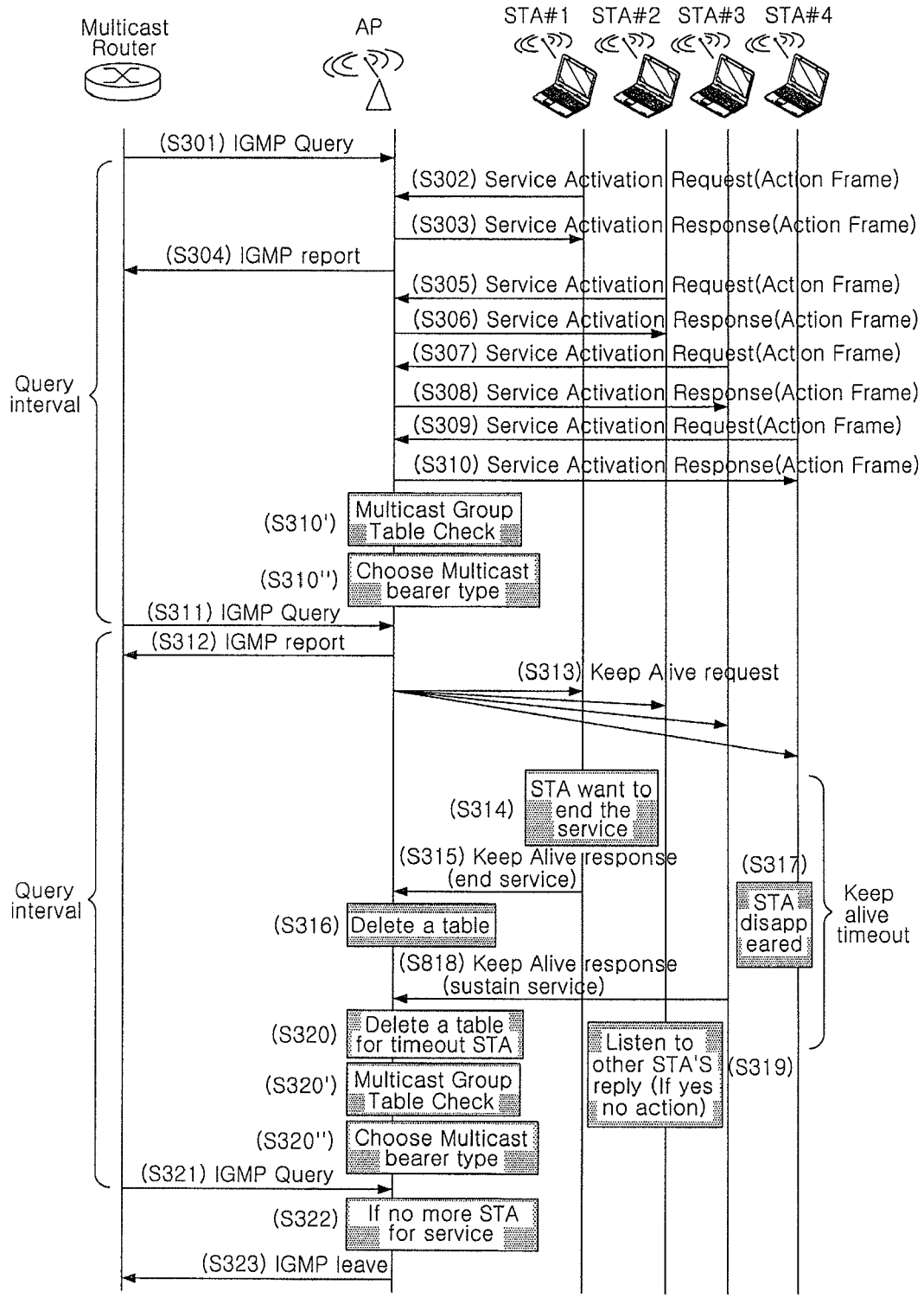
FIG. 16 is a flowchart illustrating a method of receiving multicast data by a mobile terminal according to an embodiment of the present invention.
Figure 17:
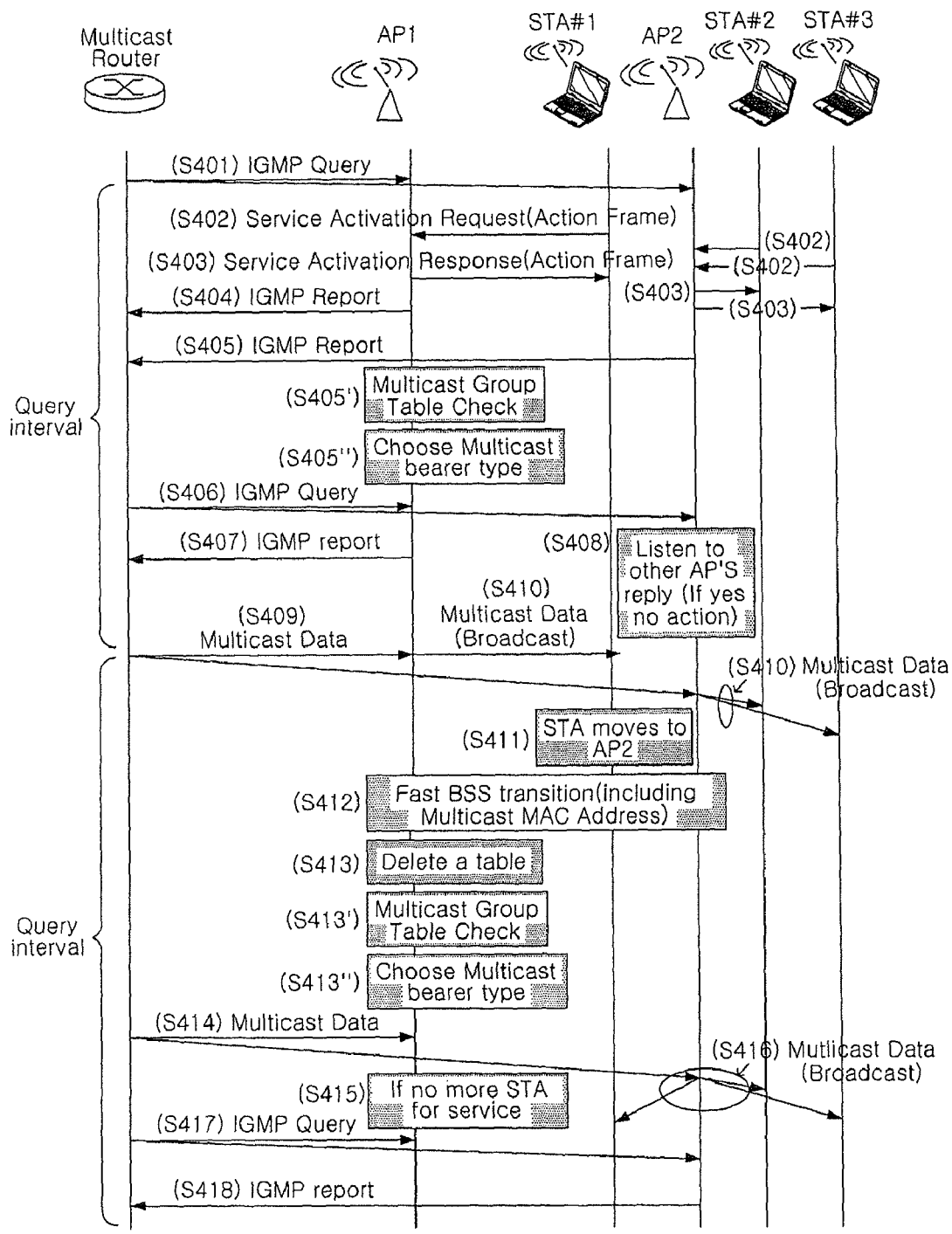
FIG. 17 is a flowchart illustrating a method of providing a multicast service when a specific mobile terminal moves into an area of another base station.
Figure 18:
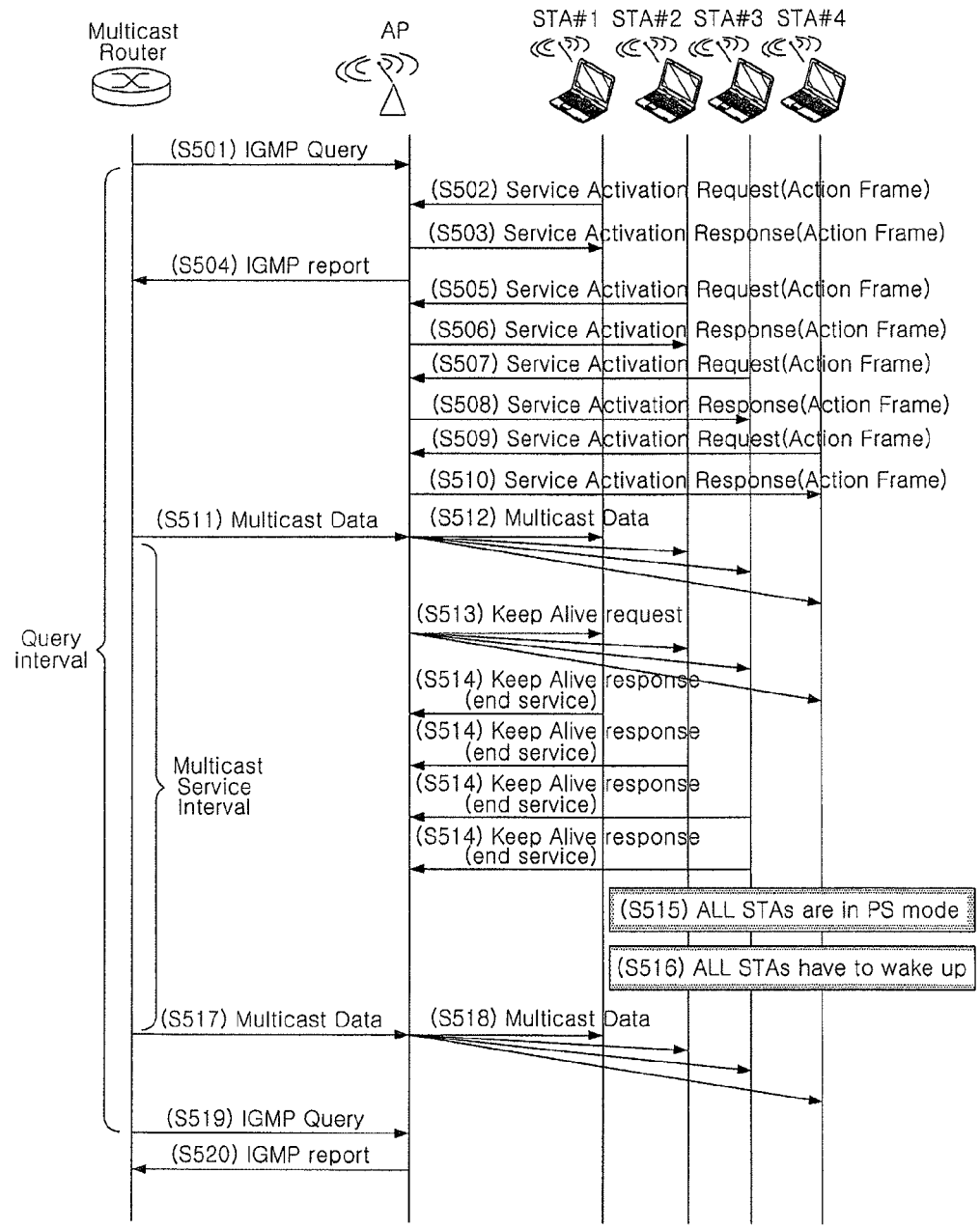
FIG. 18 is a flowchart illustrating another method of receiving multicast data by a mobile terminal of the present invention.

FIG. 1 is a flowchart illustrating a process of determining an AC of a data frame according to a first embodiment of the present invention; FIG. 2 is a schematic view illustrating a contention state between access categories (AC) within a station in the EDCA method; FIG. 3 is a schematic view illustrating an EDCA channel access method; FIG. 4 is a schematic view illustrating EDCA TXOP bursting; FIG. 5 is flowchart illustrating a process of transmitting a data frame according to a second embodiment of the present invention; FIG. 6 is a view showing an example of a service activation request action frame according to an embodiment of the present invention; FIG. 7 is a view showing another example of a service activation request action frame according to an embodiment of the present invention; FIG. 8 is a view showing an example of a service activation response action frame proposed in an embodiment of the present invention; FIG. 9 is a view showing another example of a service activation response action frame proposed in an embodiment of the present invention; FIG. 10 is a view showing an example of a keep-alive request action frame for inquiring, by a base station, whether a mobile terminal exists in a network; FIG. 11 is a view showing an example of a keep-alive request capability information element (IE); FIG. 12 is a view showing an example of a keep-alive response message according to an embodiment of the present invention; FIG. 13 is a view showing a fast BSS transition information element additionally including an information element according to an embodiment of the present invention; FIG. 14 is a view showing an example of an association request flame body according to an embodiment of the present invention; FIG. 15a is a view showing an example of an ADD-notify packet according to an embodiment of the present invention; FIG. 15b is a view showing an example of an MOVE-notify packet according to an embodiment of the present invention; FIG. 16 is a flowchart illustrating a method of receiving multicast data by a mobile terminal according to an embodiment of the present invention; FIG. 17 is a flowchart illustrating a method of providing a multicast service when a specific mobile terminal moves into an area of another base station; and FIG. 18 is a flowchart illustrating another method of receiving multicast data by a mobile terminal of the present invention.

To provide further advanced QoS in a wireless LAN, 802.11e MAC that has complemented legacy 802.11 MAC is provided.

IEEE 802.11e defines EDCA and HCCA that can support QoS at an MAC layer of a wireless LAN on the basis of the DCF transmission method of 802.11 MAC to provide a new wireless LAN MAC protocol that can transmit a traffic sensitive to transmission delay in addition to the best effort service.

802.11e defines hybrid coordination function (HCF) based on DCF and PCF of the legacy 802.11 MAC protocol. HCF includes a new medium access mechanism for improving QoS of a wireless LAN and can transmit QoS data in both a contention period and a contention free period. Hereinafter, QoS STA (QSTA: QoS station) defined in 802.11e refers to a station which supports QoS, and QoS AP (QAP) refers to a base station which supports QoS.

The HCF has two operation modes. One is enhanced distributed channel access (EDCA) based on contention, and another is HCF controlled channel access (HCCA) using a contention free channel access method based on a polling mechanism.

EDCA and HCCA are controlled by a hybrid coordinator (HC) located at a base station and are compatible with legacy 802.11 MAC using DCF and PCF. The EDCA provides a prioritized traffic similar to DiffServ of a wired network to support QoS, whereas the HCCA provides a parameterized traffic similar to IntServ of a wired network to guarantee QoS.

The EDCA method is used to support prioritized QoS in infrastructure mode and ad-hoc mode. That is, the EDCA provides a differentiated channel access function for frames that are granted with different priorities by an upper layer.

802.11e MAC establishes a virtual connection called as a traffic stream between two stations (terminals, hereinafter referred to as 'STA') before transmitting data in order to provide parameterized QoS. Characteristics of data that are actually transmitted and parameters that request QoS are subjected to negotiating and bartering operations in the process of establishing the traffic stream. The base station allocates a wireless bandwidth to each STA based on the bartered QoS parameters and schedules frame transmission to transmit polling frames, downlink frames and the like.

A transmission opportunity (TXOP) is the most fundamental concept newly added to 802.11e MAC. The TXOP of 802.11e MAC is used to assign and guarantee a predetermined time period in which frames can be transmitted to a specific STA. A TXOP can be obtained by winning EDCA contention or by receiving a QoS CF-Poll frame from the base station. The former is called EDCA TXOP and the latter is called polled TXOP.

In this manner, using a new concept of TXOP, a predetermined time period is assigned so that a certain STA can transmit frames, or a transmission time period can be forcibly limited. A transmission starting time and a maximum transmission time period are determined by the base station, which are notified to the STA through a beacon frame in the case of the EDCA TXOP or through a QoS CF-Poll frame in the case of the polled TXOP.

EDCA is used only in a contention period, whereas HCCA can be operated in both a contention period and a contention free period. However, HCCA is preferably used only in a contention period.

Hereinafter, an EDCA method to which the present invention is applied will be described.

As described above, the EDCA, i.e. a contention-based channel access method, reinforces existing DCF to permit differentiated medium access for those frames with eight classes of user priorities. Table 1 shown below summarizes user priorities (Table 1 shows user priorities according to IEEE 802.1D). Each frame arriving at the MAC layer from an upper layer has a specific user priority value, and the user priority value is loaded on the MAC header of each QoS data frame.

TABLE 1

Table of user priority to access category mappings

| User priority | 802.1D Designation | AC(Access category) | Designation |
| --- | --- | --- | --- |
| 1 | BK | AC_BK | Back Ground |
| 2 | — | AC_BK | Back Ground |
| 0 | BE | AC_BE | Best Effort |
| 3 | EE | AC_BE | Best Effort |
| 4 | CL | AC_VI | Video |
| 5 | VI | AC_VI | Video |
| 6 | VO | AC_VO | Voice |
| 7 | NC | AC_VO | Voice |

For the transmission of QoS data frames containing those user priorities, an 802.11e QoS STA implements four access categories (AC) (refer to Table 1). The user priority of a frame arriving at the MAC layer is assigned to a corresponding AC. User priorities shown in Table 1 are specified in the IEEE 802.1D bridge standard. Every AC has a transmission queue and an AC parameter, and difference of priorities between the ACs is implemented from AC parameters that are set differently from each other.

Basically, in the contention for transmission of frames which belong to the ACs, EDCA uses AIFS[AC], CWmin [AC] and CWmax[AC] instead of DIFS, CWmin and CWmax which are used by DCF. The AISF[AC] is determined by a SIFS+AIFS[AC] slot time, in which AIFS[AC] is an integer greater than 0.

At this time, according to a first embodiment of the present invention, the number of terminal devices receiving the frame is used in determining a priority of the frame at an upper layer.

The information on the number of terminal devices is obtained from a group table provided in the base station. A method of storing, by the base station, information on terminal devices connected to the base station will be described in detail below.

There are a variety of methods of determining a priority of the frame using the information on the number of terminal devices.

For example, after a primary user priority is first determined according to frame types as illustrated in Table 1, the priority can be incremented or decremented according to the information on the number of terminals. That is, the number of terminals is categorized into three groups, i.e. groups n1, n2 and n3. If the information on the number of terminals belongs to group n1, the user priority is decremented by 1. If the information on the number of terminals belongs to group n2, the user priority is not changed. If the information on the number of terminals belongs to group n3, the user priority is incremented by 1 (at this time, the number of terminals belonging to each of the groups n1, n2 and n3 may be set to an appropriate number depending on the communication types and conditions).

Alternatively, the user priority may be incremented by a predetermined step if the number of connected terminal devices obtained from the terminal information is greater than a predetermined number.

In the examples, it is apparent that the user priority values should not be out of the range of zero to seven and the types of groups can be further categorized.

As described above, according to the user priority determined by the information on the number of terminals, an AC of the frame is determined and the data frame is transferred to a transmission queue belonging to the relevant AC.

Hereinafter, a method of determining a user priority according to the first embodiment of the present invention will be described in detail with reference to the accompanying drawings.

FIG. 1 is a flowchart illustrating a process of determining an AC of a data frame according to the first embodiment of the present invention.

As shown in the figure, a first user priority of a data frame to be transmitted is first determined (S100). At this time, as specified in IEEE 802.11e, the first user priority is categorized according to the type of the data frame.

If the first user priority is determined, the number of terminals which desire to receive the data frame is checked from a group table (S110). The group table stores information on terminals which have requested the service. A method of constructing the group table will be described below.

Then, a second user priority which has been modified from the first user priority based on the number of terminals is calculated.

That is, if the number of the terminals is smaller than a first reference value m1, the data frame is determined as belonging to the group n1, and the second user priority is thus set to the first user priority decremented by 1 (S122).

Then, if the number of the terminals is not less than the first reference value m1 and not greater than a second reference value m2, the data frame is determined as belonging to the group n2 and the second user priority is thus set to the first user priority as it is (S124).

Further, if the number of the terminals is greater than the second reference value m2, the data frame is determined as belonging to the group n3 and the second user priority is thus set to the first user priority incremented by 1 (S126).

After the second user priority is determined in the manner described above, the second user priority is set to zero if the second user priority is lower than or equal to zero (S130 and S140). If the second user priority is higher than or equal to seven, the second user priority is set to seven (S160 and S170).

After adjusting the second user priority, an AC of the data frame is determined according to the second user priority (S180).

Then, the data frame is transmitted to a transmission queue corresponding to the determined AC (S190).

In the first embodiment of the present invention, the user priorities are divided into first and second ones for convenience of explanation. However, it is also possible to set one user priority and then adjust the user priority according to the number of terminals. That is, it is also possible to increment or decrement the user priority by a predetermined value according to the number of terminals, adjust upper and lower limits of the incremented or decremented user priority, and set the user priority to the adjusted user priority.

Hereinafter, a process of transferring the frame through the transmission queue will be described.

As shown in FIG. 2, each of the four AC transmission queues defined in 802.11e MAC functions as an individual EDCA contention entity to access a wireless medium within an STA. Each AC has a unique AIFS value and maintains an independent backoff counter. If one or more ACs complete a backoff procedure at the same time, the virtual collision handler coordinates collisions between the ACs. A frame with the highest priority is first selected and then transmitted to contend with other STAs, and the other ACs update the backoff counter by incrementing the CW value.

As described above, 802.11e determines a transmission time period based on a TXOP when a specific STA starts transmission. The 802.11e base station loads EDCA parameters such as AIFS[AC], CWmin[AC] and CWmax[AC], and a TXOP Limit [AC] such as an EDCA TXOP time period on a beacon frame and then transfers the beacon frame to each STA.

The backoff procedure of EDCA for creating a new backoff counter when collision occurs between STAs while transmitting frames is similar to that of existing DCF.

As shown in FIG. 3, the channel access method of EDCA is similar to that of DCF. However, arbitration inter frame space (AIFS) and CW that are different in each AC are maintained. Here, the AIFS should be a value greater than the PIFS and the DIFS to protect the transmission of ACK frames or the like by setting the value greater than at least a SIFS time period.

Values of AIFS[AC], CWmin[AC], CWmax[AC] and the like that are called an EDCA parameter set can be loaded on a beacon frame by the AP and then notified to each STA. Basically, the smaller the values of the AIFS[AC] and CWmin[AC] are, the higher priority an STA has. Accordingly, channel access delay is shortened, and thus, a further wider bandwidth can be used in a given traffic environment.

The EDCA parameters are important means used to differentiate channel accesses of a variety of user prioritized traffics. In addition, if values of the EDCA parameters containing parameters of each AC are appropriately set, network performance can be optimized and an effect of transmitting traffics according to priority can be obtained. Accordingly, to guarantee fair medium access to all participating STAs in the network, the base station is required to perform overall management and control of the EDCA parameters.

As shown in FIG. 4, during an EDCA TXOP Limit time period, a plurality of frames with a SIFS time gap between an ACK and a subsequent frame can be simultaneously transmitted. Transmitting a plurality of frames simultaneously as such is called 'EDCA TXOP bursting'.

During the EDCA TXOP Limit time period, two QoS data frames containing a priority are transmitted. At this time, it is understood that the two QoS data frames and two ACK frames are transmitted within the TXOP Limit time period determined by the base station. Since EDCA TXOP bursting always keeps the TXOP Limit when a plurality of frames are transmitted, overall network performance is not affected by the EDCA TXOP bursting. Therefore, selecting an appropriate TXOP Limit value can enhance overall network performance.

Meanwhile, according to a second embodiment of the present invention, an AC of a data frame is determined according to the first user priority in the same manner as the first embodiment, and the data frame is assigned to a transmission queue and stored therein.

However, if a collision occurs between the ACs as described above, the virtual collision handler selects and transmits a frame with the top priority. At this time, the virtual collision handler determines a data frame to be transmitted by comparing the second user priority.

Hereinafter, a method of transmitting a data frame according to the second embodiment of the present invention will be described in detail with reference to accompanying drawings.

FIG. 5 is flowchart illustrating a process of transmitting a data frame according to the second embodiment of the present invention.

As shown in the figure, a first user priority of a data frame to be transmitted is first determined (S200). At this time, as specified in IEEE 802.11e, the first user priority is categorized according to the type of the data frame.

If the first user priority is determined, the number of terminals which desire to receive the data frame is checked from the group table (S210).

Then, a second user priority which has been modified from the first user priority based on the number of terminals is calculated (S220). At this time, the second user priority can be determined through the same process as steps S122 to S170 of the first embodiment of the present invention Next, an AC of the data frame is determined according to the first user priority (S230).

Then, the data frame is transferred to a transmission queue corresponding to the determined AC (S240).

That is, up to this point, the determined second user priority is not used, and the data frame is transmitted to the transmission queue in the same manner as the first embodiment.

Thereafter, it is determined whether a collision occurs between ACs while data are transmitted (S250).

At this time, if a collision occurs, the virtual collision handler compares the user priority of the data frame with priorities of other data frames and then determines a data frame to be transmitted. At this time, the priority of the data frame is compared using the second user priority (S260).

Then, a data frame with the highest second user priority is transmitted (S270).

Here, the concept of the second user priority is adopted for convenience of explanation. That is, the second priority is not set, but the user priority is modified based on the group table according to the number of terminals which have requested services and then compared to determine a data frame to be transmitted when a collision occurs between the ACs.

Hereinafter, a method of constructing and updating the multicast group table will be described in detail.

Specific action frames are proposed to manage terminals connected to a base station in a preferred embodiment of the present embodiment. Hereinafter, an example of category values and action fields for multicast IGMP action frames according to the present embodiment is described. Tables 2 and 3 show an example of category values and an example of action fields, respectively, according to the present embodiment.

TABLE 2

Category values

| Name | Value | See-Sub field |
|---|---|---|
| Wireless Network Management | 8 | IEEE 802.1y 7.4.6 |
| Multicast GMP Action | 7 | |
| Reserved | 8-127 | |

TABLE 3

Multicast IGMP action field values

| Action field value | Description |
|---|---|
| 0 | Service Action Request |
| 1 | Service Action Response |
| 2 | Keep Alive Request |
| 3 | Keep Alive Response |
| 4-255 | Reserved |

Hereinafter, an example of the multicast IGMP action frames according to the embodiment of the present invention is explained.

FIG. 6 is a view showing an example of a service activation request action frame according to the present embodiment.

Parameters contained in the action frame of FIG. 6 are described as follows.

Category: a category value for a multicast IGMP action request action frame, which is set to '7' (multicast IGMP action).

Action: set to '0' for a multicast IGMP setup request.

Multicast MAC address: a multicast MAC address for which a base station has to process a relevant IGMP.

The multicast MAC address is an address used for identifying a specific multicast service. A multicast service can be identified by an IP address which in turn can be mapped to a specific MAC address. That is, the multicast MAC address is a MAC address onto which a specific IP address is mapped, and corresponds to a MAC address for the multicast service.

FIG. 7 is a view showing another example of a service activation request action frame according to the present embodiment.

Respective parameters contained in the action frame of FIG. 7 are described below.

Category: a category value for a multicast IGMP action request action frame, which is set to '7' (multicast IGMP action).

Action: set to '0' for a multicast IGMP setup request.

Multicast MAC address: a multicast MAC address for which a base station has to process a relevant IGMP.

Interval: sets a minimum interval for responding to a keep-alive.

The action frame according to an example of FIG. 7 further contains the interval parameter.

A variety of actions can be performed by the interval parameter added according to the present embodiment. For example, information about a multicast service period determined by a multicast service can be obtained from an upper layer of a terminal. In this case, the multicast service period can be informed to a base station that communicates with the terminal through the interval parameter. For example, the multicast service period may be 20 msec.

In this case, information about a period of 20 msec can be provided to the base station through the interval parameter. From the viewpoint of the terminal, if the multicast data are transmitted at a period of 20 msec and are actually transmitted for 5 msec, the terminal can enter a power saving (PS) mode for 15 msec or less. However, an operation of entering the power saving mode is preferably performed in connection with an operation of transmitting a keep-alive request that has been transmitted by the base station.

That is, the base station transmits a keep-alive request to confirm the presence of the terminal. It is preferred that no terminal enter the power saving mode at the time when the base station transmits the keep-alive request. If the multicast data are transmitted for 5 msec and a keep-alive request is then transmitted shortly, the terminal can receive the data and the keep-alive request, transmit a response to the keep-alive request and then enter the power saving mode. In order to smoothly perform these operations, information about the multicast service period or on the minimum period enough to respond to the keep-alive request is preferably transmitted to the base station.

In the present embodiment, therefore, it is proposed to provide specific interval information through the interval parameter.

FIG. 8 shows an example of a service activation response action frame proposed in the present embodiment. Parameters contained in the illustrated action frame are described below.

Category: a category value for a multicast IGMP action request action frame, which is set to '7' (multicast IGMP action).

Action: set to '1' for a multicast IGMP setup response.

Multicast MAC address: a multicast MAC address for which a base station has to process a relevant IGMP.

Status Code: indicates a response of the base station to a multicast IGMP setup request. Their details are shown in Table 4.

TABLE 4

Status code field

| Status code | Meaning |
| --- | --- |
| 0 | Successful |
| 1 | Unspecified Failure |
| 2-255 | Reserved |

That is, the service activation response action frame can indicate whether a request of a terminal can be accepted.

FIG. 9 shows a further example of a service activation response action frame proposed in the present embodiment. Parameters contained in the illustrated action frame are described below.

Category: a category value for a multicast IGMP action request action frame, which is set to '7' (multicast IGMP action).

Action: set to '1' for a multicast IGMP setup response.

Multicast MAC address: a multicast MAC address for which a base station has to process a relevant IGMP.

Status Code: indicates a response of the base station to a multicast IGMP setup request. Their details are shown in above Table 4.

Group Number: a value assigned by the base station to every multicast address, i.e. multicast MAC address, for the management. The group number parameter enables one or more terminals to be identified using a single group number. That is, terminals that receive the service activation response action frame can be identified by a single specific group number. It is further advantageous to identify specific terminals as a single group than to individually assign an identification number to each of a plurality of terminals. Specific terminals can be efficiently grouped through an action frame according to an example of FIG. 9. In addition, terminals belonging to the same group can be identified by a single group number.

Hereinafter, an example of a table for processing IGMP in the base station is explained.

TABLE 5

Multicast group table entry format

| Field Name | Description |
| --- | --- |
| STA's MAC Address | MAC address of a mobile terminal that transmits a request |
| Multicast MAC Address | Multicast MAC address for IGMP processing |
| Group Number | Group number given to each multicast address |
| Expiration Time | Countdown time to delete from the table |

Table 5 can be managed by the base station. However, Table 5 is merely an example of the present embodiment, and the present invention is not limited to the contents shown in Table 5. That is, the group number field shown in the table is a data field necessary when each terminal is identified by a specific group number. Thus, the group number field can be added or deleted, if necessary. The expiration time field is a data field for deleting information on a specific terminal that does not respond normally within a predetermined period of time. The table can be prevented from being excessively extended through the expiration time field, and thus, it is preferred that the expiration time field be contained in the multicast group table.

Hereinafter, a method of transmitting, by the base station, a keep-alive request message for inquiring whether a mobile terminal exists in a network is explained. In the present embodiment, three schemes to transmit the keep-alive request message are proposed. A first scheme is to transmit the keep-alive request message through a separate action frame, a second scheme is to transmit the keep-alive request message in a state where it is contained in a beacon message, and a third scheme is to piggyback the keep-alive request message on multicast data.

In the first place, the first scheme is explained.

FIG. 10 shows an example of a keep-alive request action frame for inquiring, by a base station, whether a mobile terminal exists in a network. A mobile terminal that has received the keep-alive request action frame can transmit a keep-alive response action frame for informing the base station of its presence.

Parameters contained in the action frame of FIG. 10 are described below.

Category: a category value for a multicast IGMP action request action frame, which is set to '7' (multicast IGMP action).

Action: set to '2' for a keep-alive request.

Multicast MAC address: a multicast MAC address for which a base station has to process a relevant IGMP.

Group Number: indicates a group that should send a response to the keep-alive request. Group number '0' can be used to indicate that all the mobile terminals should respond. As described above, the group number may be used to identify one or more terminals as a single group and can be used in the action frames of FIGS. 9 and 10.

Now, the second scheme to transmit a keep-alive request message is explained.

An example of sending a keep-alive request message in a state where it is carried on a beacon is described below.

TABLE 6

| Order | Information | Notes |
| --- | --- | --- |
| TBD | Keep-Alive Request Capability | Include information for inquiring whether terminals exist in a network |

FIG. 11 shows an example of a keep-alive request capability information element. The information element (IE) is constructed as shown in FIG. 11 and allows a keep-alive request message to be carried on the beacon.

Parameters of the keep-alive request capability IE are described below.

Keep-alive request: set to '1' when a keep-alive request is transmitted through a beacon.

Group Number: indicates a group that should transmit a response to the keep-alive request. As described above, group number '0' can be used to indicate that all the mobile terminals should respond.

Next, the third scheme to transmit a keep-alive request message is described.

That is, a scheme to piggyback a keep-alive request on multicast data is described. The piggybacking scheme is again divided into two types.

One is to modify the type and subtype of the frame control field in the MAC frame format. That is, the fact that the keep-alive request message is contained in a portion of the frame body of a MAC frame can be informed using the type and subtype information. If the type and subtype information are assigned as shown in Table 7, a terminal can be aware that the keep-alive request message is contained in a portion of the frame body of the MAC frame.

TABLE 7

| Valid type and subtype combinations | | | |
| --- | --- | --- | --- |
| Type value b2, b3 | Type value descriptor | Subtype value b7 b6 b3 b4 | Subtype description |
| 10 | DATA | 101 | Multi cast DATA + Keep Alive Request |

The keep-alive request message is preferably contained in a first portion of the frame body. That is, a group number field is added in the first portion of the frame body, by which the keep-alive request message can be transmitted.

Through a method different from the aforementioned method, a keep-alive request can be piggybacked on the multicast data. That is, a retry bit in the frame control field of a MAC frame can be set and notified to a terminal. Generally, since multicast data are not retransmitted, the retry bit is not meaningful when the multicast data are transmitted and received. In this embodiment, based on whether the retry bit has been set, it can be identified whether the keep-alive request message has been contained in a portion of the frame body of a MAC frame.

Hereinafter, a response message to a keep-alive request message, i.e. a keep-alive response message, is described.

FIG. 12 shows an example of the keep-alive response message according to the present embodiment.

Parameters shown in FIG. 12 are described below.

Category: a category value for a multicast IGMP action request action frame, which is set to '7' (multicast IGMP action).

Action: set to '3' for a keep-alive response.

Multicast MAC address: a multicast MAC address for which a base station has to process a relevant IGMP.

Cause: contents transmitted to the base station from a terminal in response to a keep-alive request.

TABLE 8

| cause code | Meaning |
| --- | --- |
| 0 | Sustain Service |
| 1 | End Service |
| 2-255 | Reserved |

Hereinafter, a variety of methods of confirming, by a base station, whether the terminals recorded in the multicast group table of Table 5 actually exist in a network will be described using the aforementioned action frames and the like.

A First Method:

A base station transmits a keep-alive request action frame to terminals in consideration of the expiration time field in the multicast group table. Each of terminals that receive the action frame informs the AP of its presence through a keep-alive response action frame. At this time, a terminal that has received the keep-alive request action frame transmits a keep-alive response action frame to the base station. Here, it is preferred that all terminals capable of communicating with the base station transmit the keep-alive response action frame to the base station and that only the keep-alive response action frames from the terminals specifically incapable of communicating with the base station are not transmitted.

A Second Method of Transmitting a Keep-alive Request Message Through a Beacon:

A keep-alive request message can be informed to terminals through a beacon that is periodically distributed to a network. At this time, each of terminals that receive the beacon transmits a keep-alive response action frame to a base station. As described above, a terminal that has received the keep-alive request action frame transmits the keep-alive response action frame to the base station. Here, in the same manner as the first method, it is preferred that all the terminals capable of communicating with the base station transmit the keep-alive response action frame to the base station and that only the keep-alive response action frames from the terminals specifically incapable of communicating with the AP are not transmitted.

A Third Method of Controlling a Multicast Group Table Using an Expiration Time:

While transmitting a service activation request action frame, an expiration time can be set using an interval parameter. A value of the expiration time contained in the interval parameter may be the same as the value of the expiration time field of Table 5 The value of the expiration time contained in the interval parameter is set to a value for the purpose of saving power or the like in consideration of upper applications of a terminal. That is, during the set expiration time, the terminal can enter the power saving mode and may not respond to the keep-alive request. The base station selectively transmits the keep-alive request to terminals whose expiration time in the multicast group table of Table 5 has elapsed, in order to check whether the terminals are connected to the network.

A Fourth Method of Controlling a Multicast Group Table by Transmitting a Keep-alive Request Message when Transmitting Data at Multicast Data Transmission Intervals:

When data are transmitted at multicast data transmission intervals, a keep-alive request is piggybacked to confirm whether at least one or more terminals receive the multicast service.

In this case, the method of piggybacking a keep-alive request on multicast data may be divided into two schemes as described above.

The first scheme is to inform that a keep-alive request has been contained in multicast data by modifying the values of the type and subtype of the frame control field in a MAC frame when transmitting a data frame. The base station can periodically modify the type and subtype and write a group number into a starting portion of the frame body. In addition, a terminal that has received the data frame can be aware through the type and subtype that the piggyback has been made, confirm the group number and transmit a keep-alive response.

The second scheme is to set a retry bit of a frame control field in a MAC frame and inform a terminal that a keep-alive request has been contained. The retry bit is a bit informing that a currently transmitted frame is a retransmission frame. However, the retransmission is generally not allowed in a multicast service, and thus, the retry bit is not employed in the multicast service. In this embodiment, a communication method of informing terminals that a keep-alive request is contained in the MAC frame using the set retry bit.

A terminal can send various kinds of responses to the keep-alive request depending on the conditions of the terminal.

When a terminal intends to terminate a multicast service, it can be operated as follows.

If a terminal intends to terminate a multicast service, the terminal informs the AP of the termination of the multicast service such that the AP can delete an entry from a relevant table (e.g., Table 5). The fact that the multicast service is terminated can be informed by recording 'end service' into a cause field in a keep-alive response message.

When a terminal intends to continue receiving a multicast service, it can be operated as follows.

When a terminal intends to continue receiving the multicast service, it informs the base station of the continuation of the multicast service such that the base station can maintain the entry in the relevant table. The fact that the terminal intends to continue receiving the multicast service can be informed by recording 'sustain service' into the cause field in a keep-alive response message.

When a terminal is timed out while responding to a keep-alive request, it can be operated as follows. If a terminal does not respond to a keep-alive request due to all abnormal operation (e.g., power shutoff) and thus is timed out, the base station deletes information on the relevant terminal from the entries of a relevant table.

In the present invention, the following information elements are proposed such that wireless resources can be efficiently used when a mobile terminal moves to another network, i.e. to another base station.

FIG. 13 is a view showing a fast BSS transition information element additionally including an information element according to the present embodiment. Parameters contained in the information element of FIG. 13 are described below.

The information element of FIG. 13 is a modification of message that is provided in IEEE 802.11R. The information element of FIG. 13 further contains a multicast MAC address. Using the multicast MAC address, the previous base station that has received a message containing the information element can delete the STA's MAC address field of the terminal STA, which has transmitted the information, from the multicast group table of Table 5 by deleting a relevant entry regarding the multicast MAC address. In addition, a new base station to which the mobile terminal moves can register the STA's MAC address of the terminal into the multicast group table of Table 5 by inserting an entry regarding the multicast MAC address.

Parameters contained in the information element of FIG. 13 are described below.

Multicast MAC address: sends a multicast MAC address to register a relevant entry into the multicast group table of the new base station.

However, in the above method, the fast BSS transition is accomplished over the DS. In the case of over-the-air (OTA) where the terminal is directly connected to a target base station without using the previous base station, the previous and target base stations cannot know which multicast service is currently used by the terminal. In this case, when the terminal transmits an association request for connection to the target base station, it is preferable to transmit the association request together with a multicast MAC address element to allow the target AP to know which multicast service is currently used by the terminal.

Accordingly, as shown in an example of an association request frame body of FIG. 14, it is preferred that the association request frame include multicast MAC address information containing information regarding the service currently used by the terminal.

Meanwhile, if the multicast MAC address is set in the association request, it is preferred that the target base station inform the previous base station of new association using the inter-access point protocol (IAPP), ADD-notify packet, or MOVE-notify packet defined in IEEE 802.11F.

As shown in FIG. 15a, therefore, when the ADD-notify packet is used, a multicast MAC address is included in ADD-notify data. In addition, as shown in FIG. 15b, when the MOVE-notify packet is used, a multicast MAC address is included in MOVE-notify data.

Hereinafter, a method of transmitting multicast data using the aforementioned action frames, information elements and the like will be described with reference to FIGS. 16 to 18.

A mobile terminal joins a service to receive a multicast service from a service provider. A process of joining a service is performed on an application of the mobile terminal. Therefore, the mobile terminal knows the start of the multicast service and prepares to receive the multicast service. Next, a procedure for creating an information transfer path from the service provider to the mobile terminal is performed. The procedures shown in FIGS. 16 to 18 are performed when the mobile terminal already knows the start of the multicast service by the operation of the application layer and the operations for transferring information by the service provider is actually executed.

FIG. 16 is a flowchart illustrating a method of receiving multicast data by a mobile terminal according to an embodiment of the present invention.

First, the multicast router notifies information on the multicast service for the terminals to all the connected base stations through an IGMP query (S301).

As described above, the mobile terminals can already know the start of the multicast service. If the mobile terminal wishes to receive the multicast service, it transmits a service activation request action frame proposed in this embodiment. At this time, a multicast MAC address for the relevant multicast service is carried on the service activation request action frame (S302).

A base station that has received the service activation request action frame transmits a service activation response action frame to the relevant mobile terminal when it can transmit an IGMP. Then, the base station records information on the relevant mobile terminal into the multicast group table. The multicast address and expiration time contained in the multicast group table are preferably set according to the service activation request action frame transmitted in step S302 (S303).

The base station allows the relevant mobile terminal to join the relevant multicast service by transmitting an IGMP report for the relevant multicast service to the multicast router. The multicast router that has received the IGMP report specifies in a multicast group membership list that the network (i.e., the base station) requests the relevant multicast service (S304).

Each of the other mobile terminals that wish to receive the multicast service can transmit a service activation request action frame, and the base station can respond to the service activation request action frame (S305 to S310).

Then, the base station examines the multicast group table (S310'). At this time, the base station checks the number of terminals, which wish to receive the multicast service, based on the multicast group table and determines whether a point-to-point or point-to-multipoint bearer is used for the multicast service (S310").

The multicast router transmits an IGMP query to all the base stations every time interval to maintain the multicast group membership list (S311).

Accordingly, a base station receives the IGMP query and searches for the multicast group table. If a service request for the relevant multicast service exists in the multicast group table, the base station transmits an IGMP report to the multicast router. If no service request for the relevant multicast service exists in the multicast group table, the base station transmits an IGMP leave to the router (S312).

The base station periodically transmits a keep-alive request to every mobile terminal in order to maintain the multicast group table (S313). The keep-alive request can be transmitted according to any one of the aforementioned diverse methods.

The first terminal STA#1 that has received the keep-alive request determines to terminate the multicast service (S314).

The first terminal STA#1 sets the cause code of the keep-alive response of this embodiment to 'end service' and transfers the set keep-alive response to the base station (S315).

The base station deletes information on the first terminal STA#1 from the multicast group table (S316).

The third terminal STA#3 determines to continue receiving the multicast service, sets the cause code of the keep-alive response to 'sustain service' to transmit a response for continuously receiving the multicast service, and transfers the set keep-alive response to the base station (S318).

The second terminal STA#2 determines to continue receiving the multicast service. However, the second terminal receives the response message transmitted by the third terminal but does not transmit a response message to the base station (S319).

The fourth terminal abnormally disappears and cannot respond to the keep-alive request (S317).

The base station detects that the relevant mobile terminal has been timed out and then deletes a corresponding entry from the multicast group table (S320).

The multicast router retransmits an IGMP query after the query interval (S321).

If all the mobile terminals do not wish to receive the multicast service (S322), the base station transmits an IGMP leave to the multicast router and thus the relevant multicast service is terminated (S323).

The base station examines the multicast group table updated as above, every query interval (step 320').

At this time, the base station checks the number of terminals, which wish to receive the multicast service, based on the multicast group table and then determines whether a point-to-point or point-to-multipoint bearer is used for the multicast service (S320").

FIG. 17 is a flowchart illustrating a method of providing a multicast service when a specific mobile terminal moves into an area of another base station.

First, the multicast router informs all the connected base stations AP1 and AP2 of information on the multicast service through an IGMP query (S401).

As described above, the mobile terminals can already know the start of the multicast service. If the mobile terminal wishes to receive the multicast service, it transmits a service activation request action frame proposed in the present embodiment. At this time, a multicast MAC address for the relevant multicast service is carried on the service activation request action frame (S402).

A base station that has received the service activation request action frame transmits a service activation response action frame to the relevant mobile terminal when it can transmit an IGMP (S403).

The base station1 (AP1) allows the relevant terminal to join the relevant multicast service by transmitting an IGMP report for the multicast service to the multicast router (S404).

Further, the base station2 (AP2) allows the relevant terminal to join the relevant multicast service by transmitting an IGMP report for the multicast service to the multicast router (S405).

At this time, the AP also examines the multicast group table (S405'). At this time, the base station checks the number of terminals, which wish to receive the multicast service, based on the multicast group table and then determines whether a point-to-point or point-to-multipoint bearer is used for the multicast service (S405").

An IGMP query is transmitted to all the base stations in the same manner as step S401 (S406), and the base station1 transmits an IGMP report to the router (S407).

The base station2 may receive the IGMP report transmitted by the AP1 but not transmit an IGMP report to the router (S408).

The multicast router transmits multicast data to all the base stations in the network (S409).

All the base stations receive the multicast data and transmit the multicast data into the network (S410).

Until now, the first terminal has communicated with the base station1, and the second and third terminals have communicated with the base station 2. However, the first terminal moves into an area of the base station2 and can communicate with the base station AP2 (S411).

The fast BSS transition information element of this embodiment contains information on a relevant multicast MAC address. Therefore, the relevant multicast MAC address is recorded in the information element, and a fast BSS transition is then performed. In this manner, information on the multicast service is stored in the multicast group table of the base station AP2 (S412).

Since the first terminal STA#1 does no longer exist in the base station AP1, information on the first terminal is deleted from the relevant entry of the multicast group table according to the fast BSS transition information element (S413).

Then, as described above, the base station examines the multicast group table updated as described above every query interval (S413').

At this time, the base station checks the number of terminals, which wish to receive the multicast service, based on the multicast group table and then determines whether a point-to-point or point-to-multipoint bearer is used as a bearer for the multicast service (S413").

The multicast router retransmits multicast data to all the base stations in the network (S414).

Since there is no terminal for receiving the relevant multicast data, the base station AP1 does not transmit the received multicast data into the network (S415). Accordingly, wireless resources can be efficiently utilized.

The base station AP2 retransmits the received multicast data into the network such that terminals including the first terminal STA#1 can receive the multicast data (S416).

The multicast router retransmits an IGMP query after the query interval (S417).

The base station AP2 transmits an IGMP report in response to the IGMP query (S418).

FIG. 18 is a flowchart illustrating another example of a method of receiving a multicast service of a mobile terminal according to the embodiment. In FIG. 18, the multicast service is provided at a regular interval. The regular interval, i.e. the multicast service interval, can be set by a service provider. Further, the regular interval may exist or not.

First, the multicast router informs all the connected base stations of information on the multicast service for the terminals through an IGMP query (S501).

As described above, the mobile terminals can already know the start of the multicast service. If the mobile terminal wishes to receive the multicast service, it transmits a service activation request action frame proposed in this embodiment. At this time, a multicast MAC address for the relevant multicast service is carried on the service activation request action frame (S502).

A base station that has received the service activation request action frame transmits a service activation response action frame to the relevant mobile terminal when it can transmit an IGMP (S503).

The base station allows the relevant mobile terminal to join the relevant multicast service by transmitting an IGMP report for the relevant multicast service to the multicast router (S504).

Each of the other mobile terminals that wish to receive the multicast service can transmit a service activation request action frame to the base station, which in turn can respond to the service activation request action frame (505 to S510).

The multicast router transmits multicast data to all the base stations in the network (S511).

All base stations receive the multicast data and transmit the received multicast data into the network (S512).

If there are no multicast data to be transmitted, the base station of the embodiment transmits a keep-alive request to the network (S513). Since the keep-alive request can be transmitted in various ways as described above, step S513 can be performed in various ways. If the keep-alive request is transmitted immediately after the multicast data have been transmitted, the terminal does not have to enter the PS mode. Since the terminal already knows that the keep-alive request is transmitted immediately after the multicast data have been transmitted, it does not enter the PS mode. Alternatively, the terminal can enter the PS mode after transmitting a response to the keep-alive request. In this manner, it is possible to prevent the terminal from failing to respond to the keep-alive request and to allow the terminal to stay in the PS mode further longer.

A mobile terminal that has received the keep-alive request determines to continue receiving the multicast service, sets a keep-alive response to 'end service', and transfers the set keep-alive response to the base station (S514). At least any one of the four terminals shown in the figure can transmit the keep-alive response.

All the terminals can enter the PS mode within the multicast service interval (S515).

At the end of the multicast service interval, all the terminals wake up to receive multicast data (S516).

The multicast router transmits multicast data to all the base stations in the network (S517). All the base stations receive the multicast data and transmit the received multicast data into the network (S518). After the query interval has been elapsed, the multicast router transmits an IGMP query to the network (S519). The base station receives the IGMP query and transmits an IGMP report to the multicast router to receive the multicast service (S520).

The following advantages can be expected from the data transmission method and the wireless communication base station therefor according to the present invention described above.

That is, since data are transmitted in consideration of the number of terminals that desire to receive a multicast service, there is an advantage in that optimal data transmission can be performed in consideration of a state of a user when the data are transmitted.

Accordingly, data can be transmitted in consideration of subjective importance related to a state of a user' request together with general importance determined according to the type of data to be transmitted.

Further, since terminal information is continuously provided to the base station and then updated, there is another advantage in that the frequency of the users' requests varying with time can be considered in data transmission.

The scope of the present invention is not limited to the aforementioned preferred embodiments but defined by the appended claims. It will be readily understood by those skilled in the art that various modifications and changes can be made thereto without departing from the spirit and scope of the present invention defined by the appended claims.

For example, in the first embodiment of the present invention, the user priority can be determined in consideration of the number of terminals which have joined the multicast service, when initially setting a user priority.

Further, in the second embodiment of the present invention, a second user priority is not calculated in advance, but the user priority of a data frame is adjusted considering the number of terminals, which have joined the multicast service, and a data frame to be transmitted is then selected based on the adjusted user priority, when a collision occurs between ACs.

What is claimed is:

1. A wireless communication system for use in a network where a multicast service is provided to at least one or more terminals in contention-based channel access mode, the system comprising:
a terminal; and
a wireless communication base station for use in a network where a multicast service is received from a network entity and is provided to at least one or more terminals in contention-based channel access mode of a wireless communication, the base station comprising:

a storage unit for storing terminal information including the number of terminals which have joined the multicast service; and a priority determining unit for setting a user priority of a data frame to be transmitted using the terminal information, wherein the priority determining unit determines the user priority of the frame according to a priority table and adjusts the user priority using the terminal information stored in the storage unit.

2. The system as claimed in claim 1, wherein the user priority is adjusted by classifying the number of terminals, which have joined the multicast service, into a plurality of groups, putting an adjustment value to each group, and adjusting the user priority according to the adjustment value of a group corresponding to the number of terminal that desire to receive the data frame.

3. The system as claimed in claim 2, wherein the priority determining unit sets the user priority to zero if the adjusted user priority is smaller than zero, and sets the user priority to seven if the adjusted user priority is greater than seven.

4. A wireless communication system for use in a network where a multicast service is provided to at least one or more terminals in contention-based channel access mode, the system comprising:

a terminal; and a wireless communication base station for use in a network where a multicast service is received from a network entity and is provided to at least one or more terminals in contention-based channel access mode of a wireless communication, the base station comprising:

a storage unit for storing terminal information including the number of terminals which have joined the multicast service; and a priority determining unit for setting a user priority of a data frame to be transmitted using the terminal information, wherein the priority determining unit determines a first user priority of the frame according to the priority table, and creates a second user priority by adjusting the first user priority using the terminal information stored in the storage unit.

5. The system as claimed in claim 4, wherein the user priority is adjusted by classifying the number of terminals, which have joined the multicast service, into a plurality of groups, putting an adjustment value to each group, and adjusting the first user priority according to the adjustment value of a group corresponding to the number of terminal that desire to receive the data frame.

6. The system as claimed in claim 5, wherein the priority determining unit sets the second user priority to zero if the second user priority is smaller than zero, and sets the second user priority to seven if the second user priority is greater than seven.

7. The system as claimed in claim 4, wherein the user priority is adjusted by incrementing the user priority by a predetermined value if the number of terminals that desire to receive the data frame is greater than a reference value.

8. The system as claimed in claim 4, wherein the user priority is adjusted by decrementing the user priority by a predetermined value if the number of terminals that desire to receive the data frame is smaller than a reference value.

9. A wireless communication system for use in a network where a multicast service is provided to at least one or more terminals in contention-based channel access mode, the system comprising:

a storage unit for storing terminal information including the number of terminals which have joined the multicast service;

a priority determining unit for setting a user priority of a data frame to be transmitted; and a virtual collision handler for selecting a data frame to be transmitted from a queue, in which the data frame is stored, using the terminal information if a collision occurs between ACs (access categories), wherein the virtual collision handler selects a data frame by adjusting the user priority using the terminal information, comparing the adjusted user priority with other user priorities and selecting a data frame with a highest adjusted user priority.

10. The system as claimed in any one of claims 1-8 and 9, wherein the terminal information of mobile terminals that have joined the multicast service is updated at predetermined time intervals.

11. A data transmission method for use in a network where a multicast service is received from a network entity and is provided to at least one or more terminals in contention-based channel access mode of a wireless communication, the method comprising the steps of:

(a) determining, by a priority determining unit provided to a base station, a user priority of a data frame to be transmitted;

(b) examining terminal information of a terminal, which desires to receive the data frame, from a storage unit for storing terminal information of terminals which have joined the multicast service;

(c) adjusting the user priority using the terminal information; and (d) determining an AC (access category) of the data frame based on the adjusted user priority.

12. The method as claimed in claim 11, wherein the user priority is determined according to a priority table.

13. The method as claimed in claim 12, wherein the user priority is adjusted by classifying the number of terminals, which have joined the multicast service, into a plurality of groups, putting an adjustment value to each group, and incrementing or decrementing the user priority according to the adjustment value of a group corresponding to the number of terminal that desire to receive the data frame.

14. The method as claimed in claim 12, wherein the user priority is adjusted by incrementing the user priority by a predetermined value if the number of terminals that desire to receive the data frame is greater than a reference value.

15. The method as claimed in claim 12, wherein the user priority is adjusted by decrementing the user priority by a predetermined value if the number of terminals that desire to receive the data frame is smaller than a reference value.

16. The method as claimed in any one of claims 11 to 15, further comprising, after step (c), the steps of:

setting the user priority to zero if the adjusted user priority is smaller than zero; and setting the user priority to seven if the adjusted user priority is greater than seven.

17. The method as claimed in claim 16, wherein the data frame is stored in a transmission queue corresponding to the determined AC (access category).

18. The method as claimed in claim 17, wherein a virtual collision handler selects and transmits a data frame with a highest adjusted user priority if a collision occurs between ACs (access categories) when the data frame is transmitted.

19. A data transmission method for use in a network where a multicast service is received from a network entity and is provided to at least one or more terminals in contention-based channel access mode of a wireless communication, the method comprising the steps of:

examining terminal information of a terminal, which desires to receive a data frame to be transmitted, from a storage unit for storing terminal information of terminals which have joined the multicast service;

determining, by a priority determining unit provided to a base station, a user priority of the data frame to be transmitted using the terminal information; and determining an AC (access category) of the data frame based on the user priority, wherein the user priority is determined by classifying the number of terminals, which have joined the multicast service, into a plurality of groups, putting an adjustment value to each group, and incrementing or decrementing the user priority, which is set according to a priority table, according to the adjustment value of a group corresponding to the number of terminal that desire to receive the data frame.

20. A data transmission method for use in a network where a multicast service is received from a network entity and is provided to at least one or more terminals in contention-based channel access mode of a wireless communication, the method comprising the steps of:

examining terminal information of a terminal, which desires to receive a data frame to be transmitted, from a storage unit for storing terminal information of terminals which have joined the multicast service;

determining, by a priority determining unit provided to a base station, a user priority of the data frame to be transmitted using the terminal information; and determining an AC (access category) of the data frame based on the user priority, wherein the user priority is determined by incrementing the user priority, which is set according to the priority table, by a predetermined value if the number of terminals that desire to receive the data frame is greater than a reference value.

21. A data transmission method for use in a network where a multicast service is received from a network entity and is provided to at least one or more terminals in contention-based channel access mode of a wireless communication, the method comprising the steps of:

examining terminal information of a terminal, which desires to receive a data frame to be transmitted, from a storage unit for storing terminal information of terminals which have joined the multicast service;

determining, by a priority determining unit provided to a base station, a user priority of the data frame to be transmitted using the terminal information; and determining an AC (access category) of the data frame based on the user priority., wherein the user priority is determined by decrementing the user priority, which is set according to the priority table, by a predetermined value if the number of terminals that desire to receive the data frame is smaller than a reference value.

22. A data transmission method for use in a network where a multicast service is received from a network entity and is provided to at least one or more terminals in contention-based channel access mode of a wireless communication, the method comprising the steps of:

determining, by a priority determining unit provided to a base station, a user priority of a data frame to be transmitted;

determining an AC (access category) of the data frame based on the user priority;

examining terminal information of a terminal, which desires to receive the data frame, from a storage unit for storing terminal information of terminals that have joined the multicast service, if a collision occurs between ACs (access categories) when the data frame is transmitted;

adjusting the user priority using the terminal information; and selecting and transmitting, by a virtual collision handler, a data frame with a highest adjusted user priority.

23. The method as claimed in claim 22, wherein the user priority is adjusted by incrementing the user priority by a predetermined value if the number of terminals that desire to receive the data frame is greater than a reference value, or decrementing the user priority by a predetermined value if the number of terminals that desire to receive the data frame is smaller than a reference value.

* * * * *